United States Patent [19]
Quellhorst et al.

[11] Patent Number: 5,579,859
[45] Date of Patent: Dec. 3, 1996

[54] ISOLATED FLOOR FOR MATERIAL HANDLING VEHICLE

[75] Inventors: Timothy S. Quellhorst, New Bremen; Eugene G. Bruns, Maria Stein, both of Ohio

[73] Assignee: Crown Equipment Corporation, New Bremen, Ohio

[21] Appl. No.: 386,420

[22] Filed: Feb. 10, 1995

[51] Int. Cl.$^6$ .......................... B62D 33/06; F16M 13/00; B66F 9/075

[52] U.S. Cl. .................. 180/89.13; 74/512; 248/624; 248/638

[58] Field of Search .................................. 180/210, 215, 180/216, 273, 315, 89.13; 303/19; 188/167; 74/512; 248/631, 638, 623, 624

[56] References Cited

U.S. PATENT DOCUMENTS

| | | |
|---|---|---|
| Re. 29,123 | 1/1977 | Malm et al. . |
| 1,640,326 | 8/1927 | Jonasson et al. ................. 248/624 |
| 3,088,537 | 5/1963 | LeTourneau . |
| 3,280,401 | 10/1966 | Cook et al. ........................ 303/19 |
| 3,376,990 | 4/1968 | Latall ................................ 414/634 |
| 3,507,350 | 4/1970 | Boyajian ........................... 180/273 |
| 3,531,069 | 9/1970 | Dubberley ......................... 248/638 |
| 3,774,711 | 11/1973 | Lacey ................................ 248/624 |
| 3,940,177 | 2/1976 | Miers et al. . |
| 4,061,053 | 12/1977 | Keene et al. ...................... 74/512 |
| 4,502,673 | 3/1985 | Clark . |
| 4,692,086 | 9/1987 | Morita et al. .................... 414/635 |
| 4,989,684 | 2/1991 | Conaway . |
| 5,109,939 | 5/1992 | Conaway . |
| 5,116,188 | 5/1992 | Kurohashi et al. . |
| 5,230,398 | 7/1993 | Frisbee . |
| 5,253,853 | 10/1993 | Conaway et al. . |

OTHER PUBLICATIONS

Nissan Forklift Brochure entitled "FX Compact Series" 1989.

Primary Examiner—Paul N. Dickson
Attorney, Agent, or Firm—Biebel & French

[57] ABSTRACT

A materials handling vehicle including a frame supporting a set of wheels and a rider compartment having a platform on which an operator may stand. Shock dampeners are provided positioned between the platform and the frame to isolate an operator standing on the platform from vibrations experienced by the frame. The platform includes a pair of pedals for controlling operation of the materials handling vehicle and the shock dampeners are preferably resilient members such as compression springs for receiving vibrations transmitted from the frame.

11 Claims, 7 Drawing Sheets

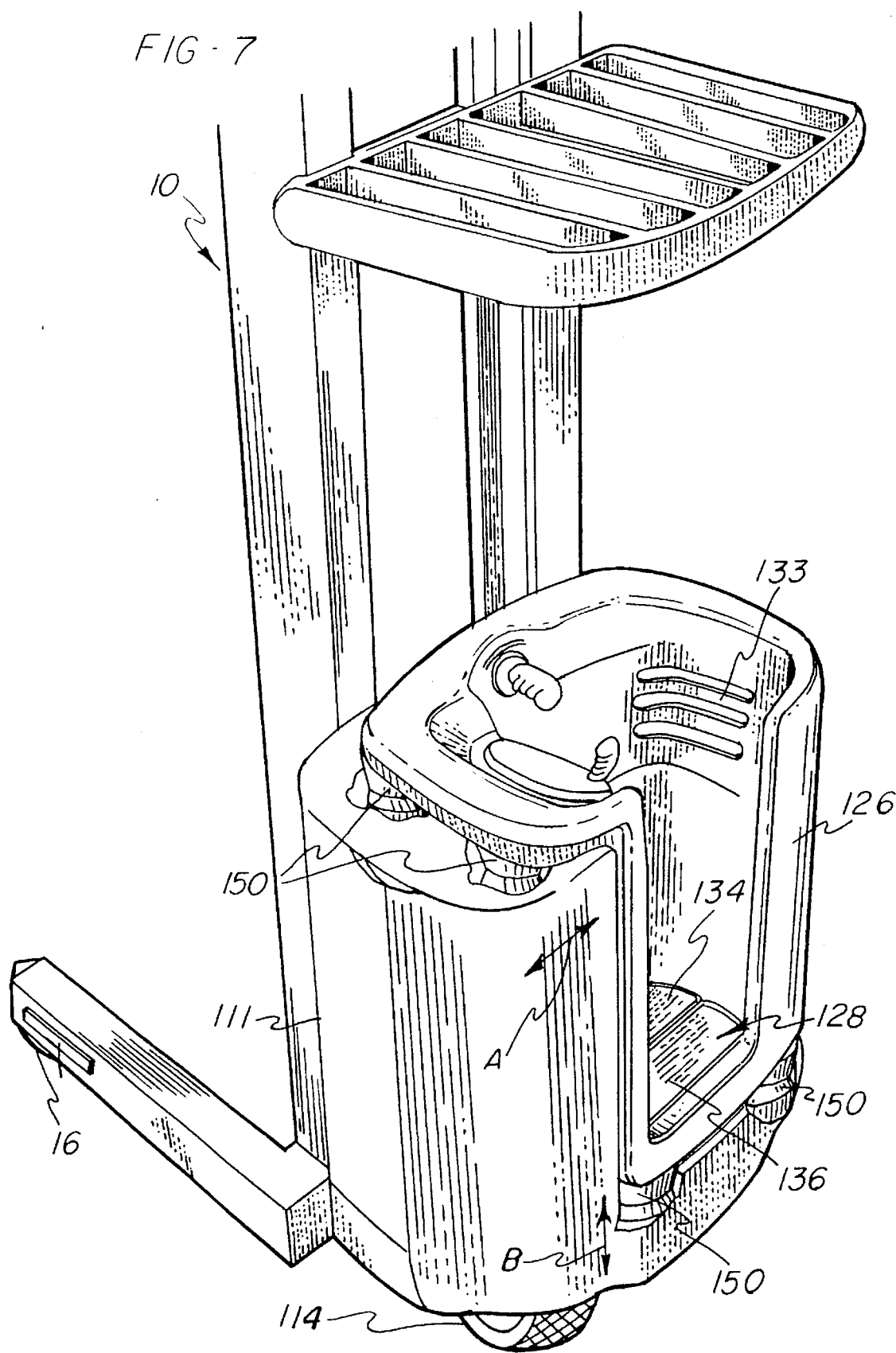

ISOLATED FLOOR FOR MATERIAL HANDLING VEHICLE

BACKGROUND OF THE INVENTION

This invention relates to a materials handling vehicle, such as a lift truck. More particularly, the present invention relates to a materials handling vehicle including means for isolating an operator of the vehicle from vibrations experienced by the vehicle during movement across a floor surface.

A typical materials handling vehicle such as a lift truck includes a supporting frame with ground engaging wheels, such as a drive wheel, caster wheel and outrigger wheels, and a mast structure extending vertically from the frame and supporting a power lift mechanism. In addition, the drive wheel is typically driven by an electric motor, and a rider compartment is defined within the frame whereby an operator may ride on the lift truck and control operations of the lift truck.

In a known materials handling vehicle adapted to be used by an operator in a standing position, the rider compartment includes a platform defined by two pedals which are moveable relative to the frame. The two pedals forming the platform comprise a floorboard, which the operator stands on with the right foot, and a brake pedal, which the operator stands on with the left foot. Typically, the toe end of the floorboard and brake pedals are pivotally mounted to the frame and the heel end is moveable from an upper to a lower position wherein the heel ends of the pedals rest on the frame in the lower position. When an operator stands on the floorboard, a switch is actuated to turn on the power for the vehicle, and when the operator stands on the brake pedal, caster and drive brakes associated with the wheels are released and power may be applied to the drive wheel from a drive motor.

As the operator travels with the materials handling vehicle, bumps or irregularities in the floor surface will be transmitted directly to the operator through the wheels and frame as a result of both ends of the pedals forming the rider compartment floor resting in contact with the frame.

While many warehouse surfaces are constructed with relatively smooth surfaces such that the minor irregularities in the floor may not pose a problem for the vehicle operator, severe or very rough floor conditions in certain warehouses may add to operator discomfort and fatigue such that a need exists for means to isolate a materials handling vehicle operator from vibrations experienced by the frame of the vehicle.

SUMMARY OF THE INVENTION

In the present invention, a materials handling vehicle such as a lift truck is constructed with an operator support portion configured to cushion an operator from vibrations or shocks experienced by the vehicle.

Specifically, in the present invention, a materials handling vehicle is provided with shock dampeners positioned between a platform for supporting an operator and a frame for the vehicle in order to isolate an operator standing on the platform from vibrations experienced by the frame. In one form of the invention, the platform comprises a pair of pedals for controlling the movement of the vehicle, and the pedals are mounted to the frame such that one end of each of the pedals is moveable relative to the frame. In addition, the moveable ends of the pedals are supported by compression springs acting as shock dampeners between the pedals and the frame. The springs are operable to absorb vibrations transmitted to the frame by a set of wheels mounted to the frame for conveying the vehicle across a floor surface.

In a further embodiment of the invention, a materials handling vehicle is provided including a rider compartment supported on a main body member wherein the rider compartment includes a platform on which an operator may stand. Shock dampeners are positioned between the rider compartment and the main body member to isolate the rider compartment from vibrations experienced by the main body member.

It is therefore an object of this invention to provide a materials handling vehicle including a rider compartment having a platform on which an operator may stand during operation of the vehicle wherein the operator is isolated from vibrations experienced by a frame of the vehicle.

It is a further object of this invention to provide a materials handling vehicle including a frame, a set of wheels supported on the frame for conveying the materials handling vehicle across a floor surface, means for supplying power to at least one of the wheels, materials handling means supported on the frame, a rider compartment located within the frame for receiving an operator, said operator compartment including a platform on which an operator may stand during operation of the vehicle, and including dampening means positioned between the platform and the frame to absorb vibrations experienced by the frame.

Other objects and advantages of the invention will be apparent from the following description, the accompanying drawings and the appended claims.

BRIEF DESCRIPTION OF THE DRAWINGS

FIG. 7 is a perspective view illustrating an alternative embodiment of the present invention.

DETAILED DESCRIPTION OF THE PREFERRED EMBODIMENT

Figure 1:
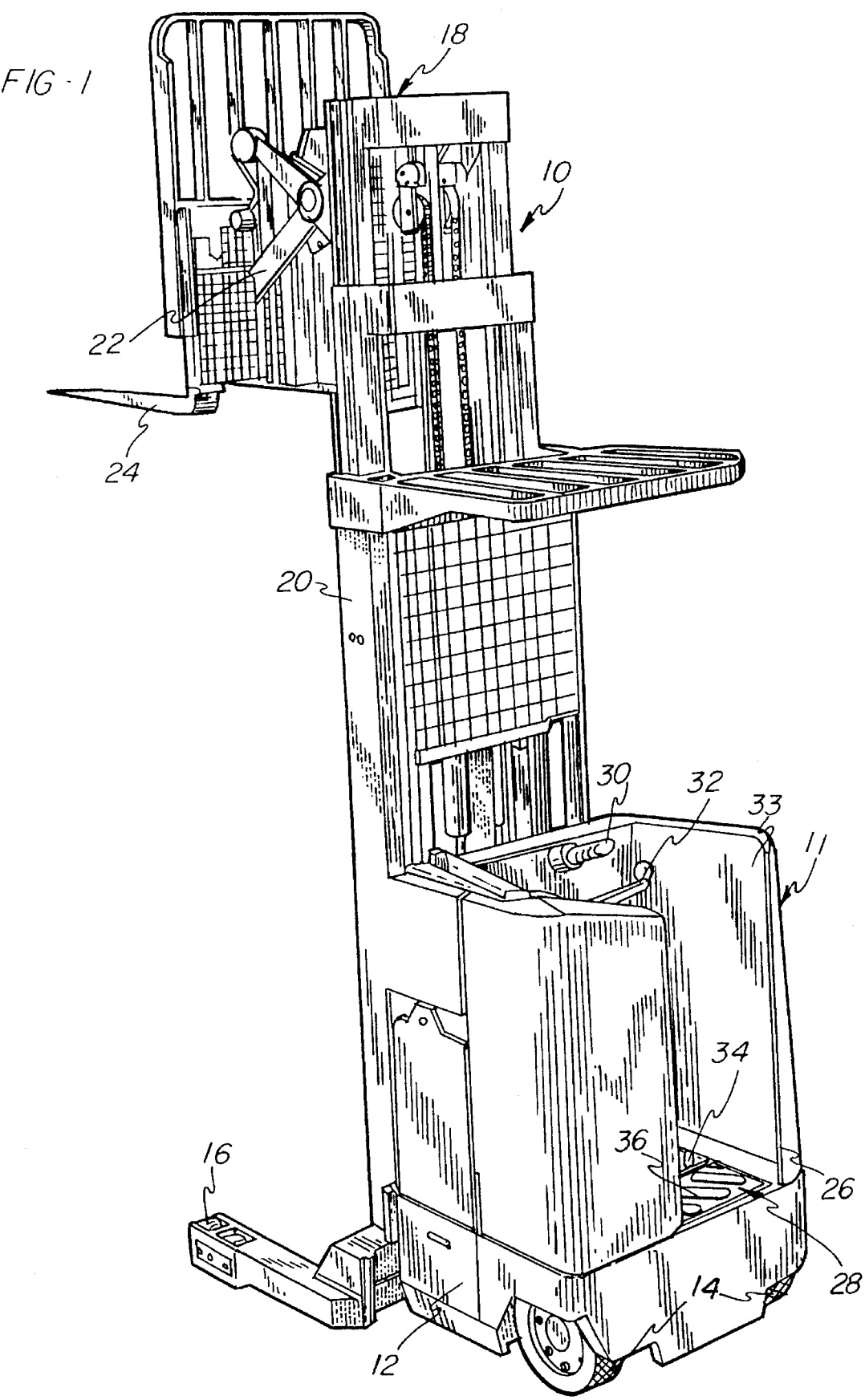
FIG. 1 is a perspective view of a materials handling vehicle incorporating the present invention.

Referring to FIG. 1, a materials handling vehicle 10 is shown comprising a main body member 11 including a frame 12, a set of wheels, such as a steerable drive wheel 14, a caster wheel 16, outrigger wheels 17 and material handling means 18. The material handling means 18 may include a mast 20 supporting a reach mechanism 22 for controlling movement of lift forks 24.

In addition, a rider compartment 26 is supported on the main body member 11 and includes a platform 28 upon which an operator may stand. The rider compartment 26 further includes controls for directing movement of the materials handling vehicle 10, and in the embodiment shown includes a multi-function control handle 30 and a steering tiller 32.

Figure 2:
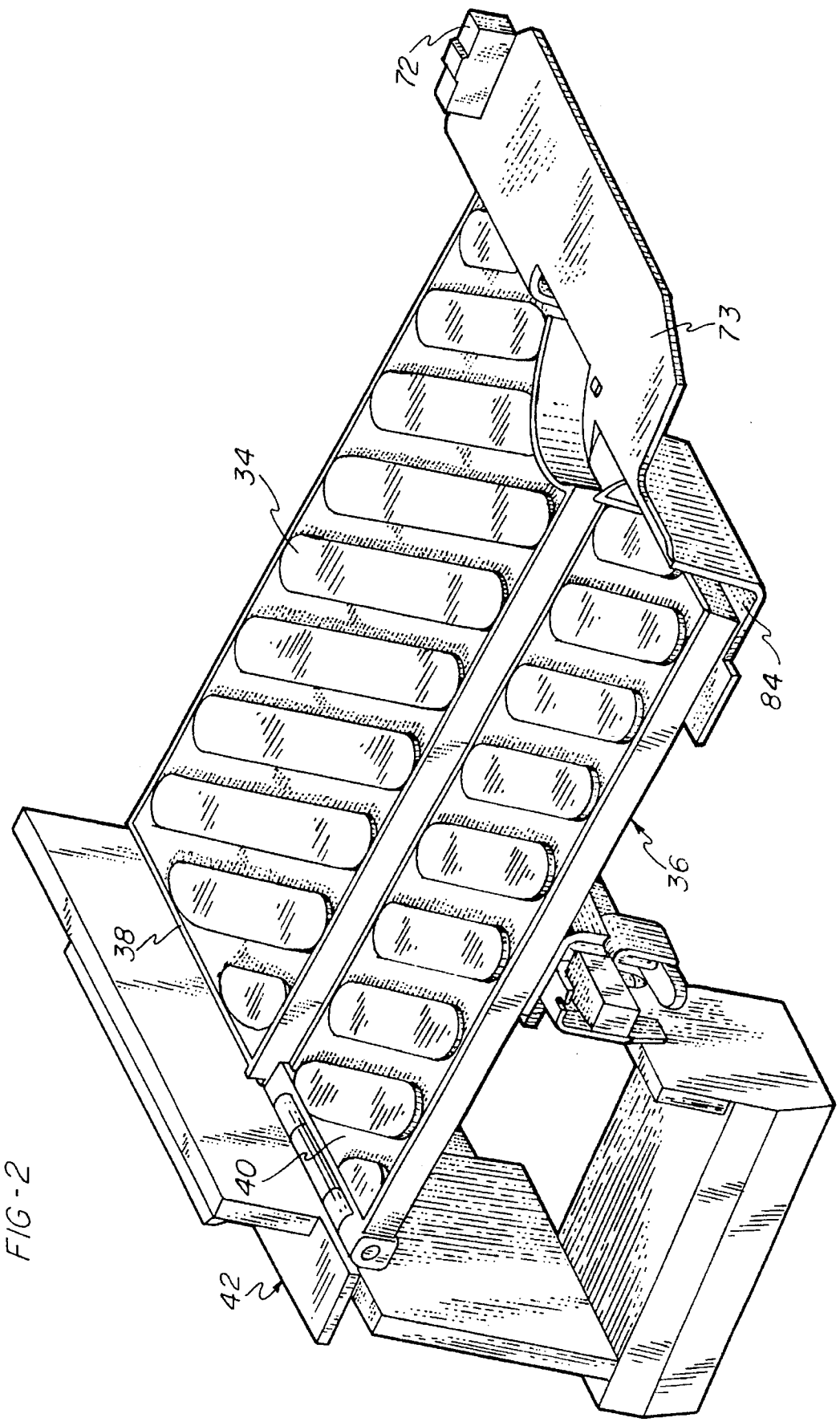
FIG. 2 is a perspective view showing a platform incorporating the shock dampening structure of the present invention.

Referring further to FIG. 2, the platform 28 comprises a floorboard 34 and a brake pedal 36. It should be noted that the rider compartment 26 is configured to receive an operator in a sideways stance leaning against a wall 33 wherein the operator's right foot rests on the floorboard 34 and the operator's left foot rests on the brake pedal 36 in a conventional manner known in the art.

Figure 3:
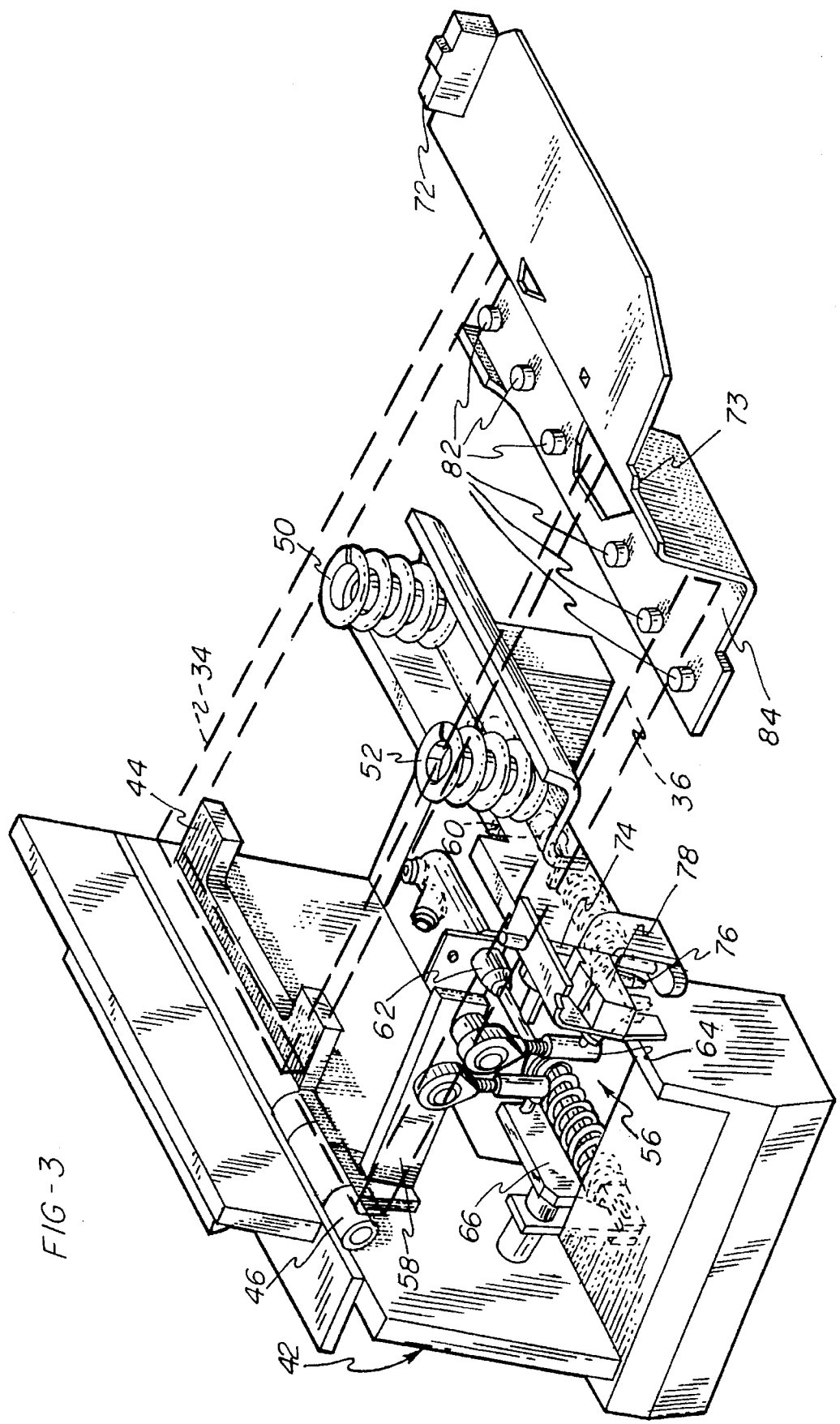
FIG. 3 is a view similar to FIG. 2 with the floorboard and brake pedals shown in phantom.
Figure 4:
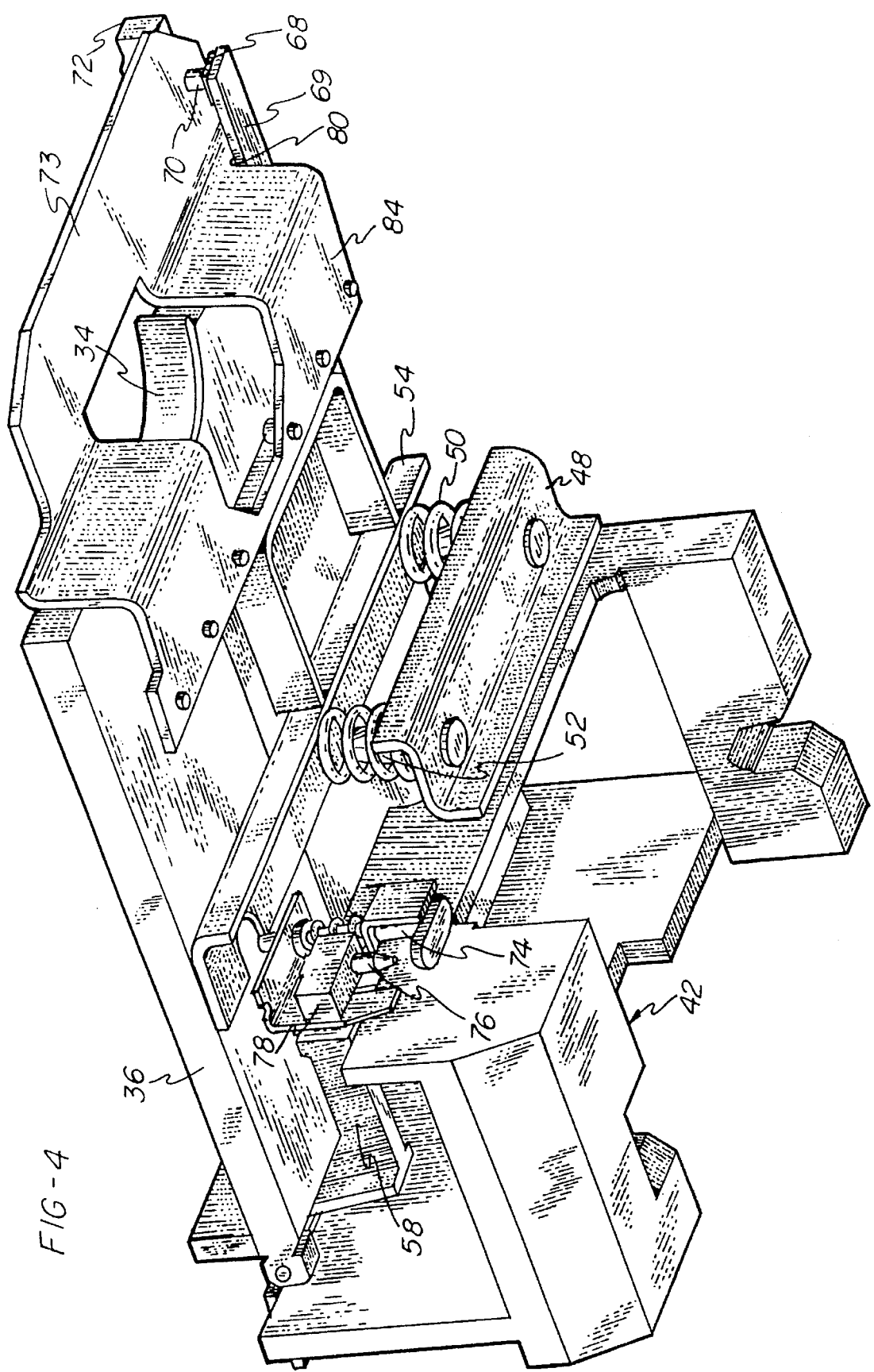
FIG. 4 is a lower perspective view of the shock dampening structure of the present invention.

Referring to FIGS. 2–4, the structure for supporting the platform 28 is shown in further detail. As mentioned previously, the platform 28 is formed by floorboard and brake pedals 34, 36 wherein toe ends 38, 40 of the floorboard and brake pedals 34, 36, respectively, are pivotally mounted to a support weldment 42 of the frame 12. In particular, as seen in FIG. 3, the floorboard 34 is mounted to the weldment 42 at a pivot mount 44 and the brake pedal 36 is mounted to the weldment 42 at a pivot mount 46.

As best seen in FIGS. 3 and 4, a spring support bracket 48 is attached to the weldment 42 for supporting a pair of compression springs 50, 52. Upper ends of the compression springs 50, 52 are located in engagement with an actuator bar 54 (FIG. 4) rigidly attached to a lower surface of the floorboard 34.

It should be noted that the brake pedal 36 is positioned in engagement with a brake actuator mechanism 56 including a pivot arm 58 linked to brake master cylinders 60, 62 whereby downward movement of the pivot arm 58 will cause linkages 64, 66 attached to the arm 58 to actuate the master cylinders 60, 62, respectively. The master cylinders 60, 62 are hydraulically connected to respective brakes on the drive wheel 14 and caster wheel 16 wherein the brakes are spring actuated to be normally engaged, and actuation of the cylinders 60, 62 causes release of the brakes. In addition, it should be noted that the brake actuation mechanism 56 is spring biased to a released position and acts on the pivot arm 58 to cause the pivot arm 58 and brake pedal 36 to move to an upwardly biased position.

Figure 5:
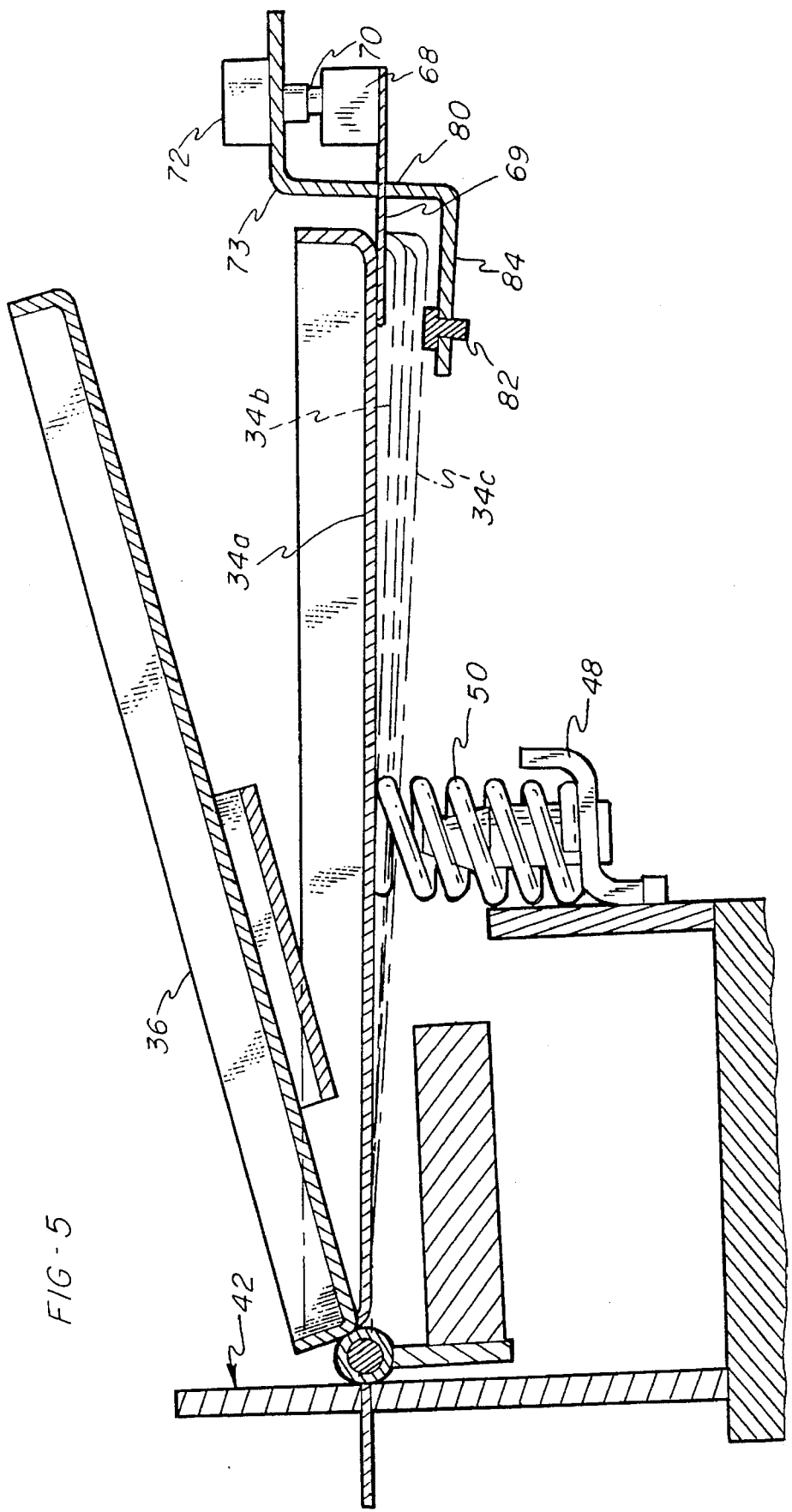
FIG. 5 is a side elevational view illustrating the positions for the pedals forming the platform.

Referring to FIG. 5, the upper position of the brake pedal 36 is illustrated, as is the range of movement for the floorboard 34. The springs 50, 52 normally bias the floorboard to a position illustrated by floorboard 34a. The floorboard 34 includes an extension bar 69 supporting a switch actuation tab 68. In the position illustrated by floorboard 34a, the tab 68 actuates the plunger 70 of a power steering switch 72 mounted to a heel support 73 whereby the steering for the materials handling device is deactivated. When an operator steps on the floorboard 34, it will move to an intermediate position, such as that illustrated by 34b, where the tab 68 is disengaged from the switch 72 such that the power steering is activated.

As the operator steps on the brake pedal 36 the brake activation mechanism 56 will be actuated to release the brakes, and the brake pedal 36 will move down to a lower limit defined by the actuation bar 54. In addition, as the brake pedal 36 moves into engagement with the actuator bar 54, a lower surface of the brake pedal 36 will engage a rod 74 (FIG. 3) which is spring biased upwardly to actuate the plunger 76 of a power switch 78. When the rod 78 is moved downwardly by the brake pedal 36, the plunger 76 will be released to allow power to be supplied to a motor connected to the drive wheel 14 in response to control signals provided by the control handle 30. The motor is preferably an electric motor mounted on the frame 12.

During normal operation, the brake pedal 36 will rest against the actuator bar 54 such that the floorboard 34 and brake pedal 36 are at substantially the same level for supporting the operator's feet. The pedals 34, 36 will be located at a static position illustrated by the position of pedal 34b in FIG. 5. As the materials handling vehicle 10 encounters bumps, such as may be caused by rough floor surfaces, the springs 50, 52 will permit the pedals 34, 36 to move within a range of positions illustrated by the upper position 34a and lower position 34c. It should be noted that upward movement of the floorboard 34 is limited by engagement between the bar 69 and a stop 80 defined on the heel support 73, and the lower position for the floorboard 34 is defined by bumpers 82 located along a horizontal flange 84 of the heel support 73. In the preferred embodiment, the compression springs 50, 52 will provide approximately ½" clearance between the pedals 34, 36 and the bumpers 82 for the heel support 73 when an operator is in position within the rider compartment 26.

Figure 6:
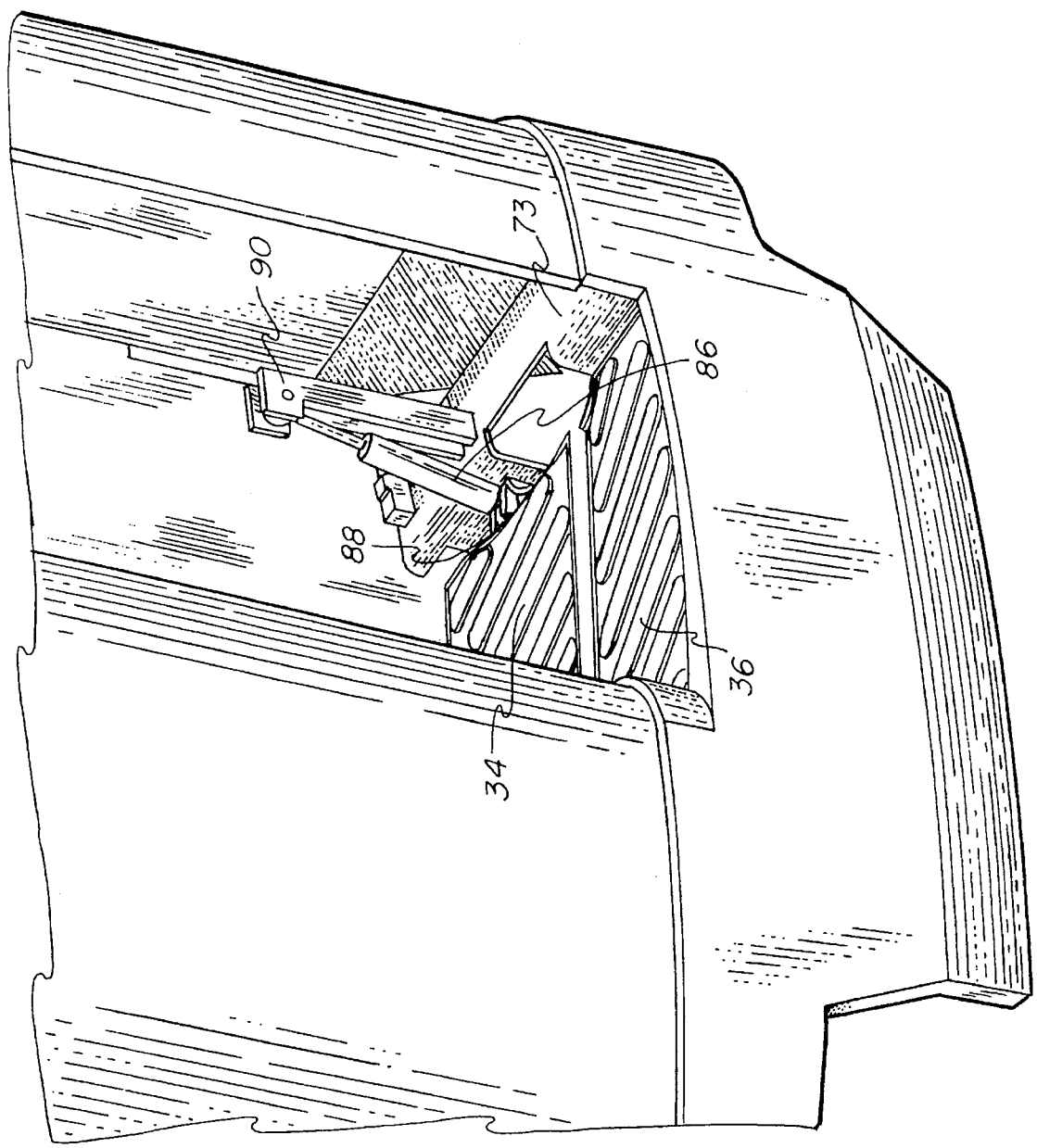
FIG. 6 is a perspective view of the floorboard area for a materials handling vehicle incorporating an alternative shock dampener.

Referring to FIG. 6, an alternative embodiment of the invention is illustrated wherein the springs 50, 52 are replaced with a spring dampener 86 such as a pneumatic spring. The spring dampener 86 extends from an attachment point 88 with a heel end of the floorboard 34 to an attachment point with a support 90 which is rigidly connected to the heel support 73. This embodiment of the invention operates in the same manner as the previous embodiment in providing cushioned resilient movement of the floorboard 34 and brake pedal 36 to isolate an operator from vibrations experienced by the frame 12 of the materials handling vehicle 10 as the vehicle 10 moves across a floor surface.

FIG. 7 illustrates an alternative embodiment for a materials handling vehicle 110 of the present invention wherein elements corresponding to elements of the first embodiment are labeled with the same reference number increased by 100. The vehicle 110 includes a main body member 111 and a rider compartment 126 having a platform 128 and a support wall 133 for supporting an operator in a standing position. The rider compartment 126 is supported on the main body member 111 by means of shock dampeners 150. The shock dampeners 150 may be in the form of compression springs or equivalent resilient support means which permit movement in horizontal and vertical directions as indicated by arrows A, B and C. The shock dampeners 150 isolate the rider compartment 126 from vibrations or bumps experienced by the main body member 111 as the vehicle 110 is conveyed over a floor surface by drive wheel 114, caster 116 and outrigger wheels 117. It should be noted that in the embodiment of FIG. 7, the platform 128 preferably comprises a pair of pedals including a floorboard 134 and a brake pedal 136 mounted to the rider compartment 126. Further, the pedals may be mounted for movement into resting engagement against the heel support during operation of the vehicle 110 since the pedals 134, 136 will be isolated from vibrations or bumps along with the entire rider compartment 126 by the shock dampeners 150.

From the above description, it should be apparent that the present invention provides a more comfortable ride for an operator during use of the materials handling vehicle over rough floor surfaces. Further, it should be apparent that this is accomplished by providing an isolated floor suspension system wherein vibrations experienced by the wheels and frame of the vehicle are transmitted into shock dampener elements, rather than being transmitted directly to the operator.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A materials handling vehicle comprising:

a frame;

a set of wheels supported on said frame for conveying said materials handling vehicle across a floor surface;

means for supplying power to at least one of said wheels;

materials handling means supported on said frame;

a rider compartment located within said frame for receiving an operator, said rider compartment including control pedals on which an operator may stand during operation of said vehicle, said control pedals supported for vertical movement relative to said frame;

a resilient member extending between said control pedals and said frame to absorb vibrations experienced by said frame; and wherein said resilient member supports the weight of an operator standing on said control pedals whereby said control pedals are supported above a lower stop position and said control pedals are resiliently movable downwardly toward said stop position in response to bumps encountered during movement of said vehicle across a floor surface.

2. The materials handling device of claim 1 wherein said resilient member is a spring.

3. The materials handling vehicle of claim 1 wherein said resilient member comprises at least one compression spring for supporting an end of at least one of said control pedals in spaced relation to said frame whereby said control pedals are movable upwardly and downwardly from a static position while supporting said operator.

4. The materials handling vehicle of claim 1 wherein said control pedals comprise a floorboard and a brake pedal, said floorboard and said brake pedal being movable relative to said frame.

5. The materials handling vehicle of claim 4 further including means for steering the vehicle, and a deadman switch actuated by movement of said floorboard and a brake actuation circuit actuated by movement of said brake pedal.

6. The materials handling vehicle of claim 4 wherein said resilient member is positioned between said frame and said floorboard.

7. The materials handling vehicle of claim 1 further including means for steering the vehicle, means for controlling application of power to said at least one of said wheels and means for controlling said materials handling means.

8. The materials handling vehicle of claim 1 wherein said means for supplying power comprises an electric motor.

9. The materials handling vehicle of claim 1 wherein at least one of said control pedals comprises a brake pedal, and downward movement of said brake pedal releases a brake for said vehicle.

10. The materials handling vehicle of claim 1 including means mounting a toe end of said control pedals to said frame wherein an end of said control pedals opposite from said toe end is supported by said resilient member for vertical movement toward said stop position.

11. The materials handling vehicle of claim 1 wherein said control pedals comprise a floorboard and a brake pedal located next to each other, said floorboard including a bar rigidly attached thereto and extending under said brake pedal, and said brake pedal being movable downwardly into engagement with said bar whereby said brake pedal and said floorboard are movable together.

* * * * *